United States Patent
Kolton et al.

(10) Patent No.: US 9,014,963 B1
(45) Date of Patent: *Apr. 21, 2015

(54) SYSTEM AND METHOD FOR PROVIDING A VIRTUAL PRESENCE WHILE SECURELY MANAGING AND APPLYING USER PROFILE DATA

(75) Inventors: Claudine Kolton, Park Ridge, IL (US); Shamim A. Naqvi, Morristown, NJ (US)

(73) Assignee: Ubetterknowme.com Inc., Park Ridge, IL (US)

( * ) Notice: Subject to any disclaimer, the term of this patent is extended or adjusted under 35 U.S.C. 154(b) by 73 days.

This patent is subject to a terminal disclaimer.

(21) Appl. No.: 13/365,515

(22) Filed: Feb. 3, 2012

(51) Int. Cl.
  G06F 15/173 (2006.01)
  G06Q 20/00 (2012.01)
  G06Q 40/00 (2012.01)
  H04W 4/00 (2009.01)

(52) U.S. Cl.
  CPC ............... *H04W 4/00* (2013.01); *G06Q 20/00* (2013.01); *G06Q 40/00* (2013.01); *G06F 15/173* (2013.01)

(58) Field of Classification Search
  CPC ...... G06F 15/173; G06Q 40/00; G06Q 20/00; H04W 4/00
  USPC ............. 455/414.1, 456.6; 707/3, 9; 701/300
  See application file for complete search history.

(56) References Cited

U.S. PATENT DOCUMENTS

| | | | |
|---|---|---|---|
| 5,754,938 A | 5/1998 | Herz et al. | |
| 5,754,939 A | 5/1998 | Herz et al. | |
| 6,571,279 B1 | 5/2003 | Herz et al. | |
| 7,072,672 B1 * | 7/2006 | Vanska et al. | 455/456.3 |
| 7,441,203 B2 | 10/2008 | Othmer et al. | |
| 7,549,576 B2 | 6/2009 | Alderucci et al. | |
| 7,637,810 B2 | 12/2009 | Amaitis et al. | |
| 7,811,172 B2 | 10/2010 | Asher et al. | |
| 8,032,714 B2 | 10/2011 | Musumeci et al. | |
| 2003/0140120 A1 * | 7/2003 | Hartman | 709/219 |
| 2003/0151547 A1 * | 8/2003 | Mauro et al. | 342/357.15 |
| 2004/0098386 A1 * | 5/2004 | Thint et al. | 707/3 |
| 2005/0009540 A1 * | 1/2005 | Lee et al. | 455/456.6 |
| 2007/0161382 A1 * | 7/2007 | Melinger et al. | 455/456.1 |
| 2008/0270230 A1 | 10/2008 | Hendrickson et al. | |
| 2008/0284562 A1 | 11/2008 | Arthurs et al. | |
| 2009/0069045 A1 * | 3/2009 | Cheng | 455/556.1 |
| 2009/0171966 A1 * | 7/2009 | Heaven et al. | 707/9 |
| 2010/0077018 A1 * | 3/2010 | Acharya et al. | 709/203 |

(Continued)

OTHER PUBLICATIONS

GuestBridge Announces Integrated Guest Loyalty Program, Press release dated May 12, 2009.

(Continued)

*Primary Examiner* — Fadey Jabr
*Assistant Examiner* — Martin Weeks
(74) *Attorney, Agent, or Firm* — Perry Hoffman

(57) ABSTRACT

Systems and methods for responding to the arrival of a person within a defined geographic area after receiving a virtual presence of the person at a target destination before actual arrival at the target destination are defined. A mobile electronic device stores user profile data and periodically outputs a unique device identification number and position data. A host server monitors the position data and when it is within the defined geographic area, the user profile data is received from the mobile electronic device and transmitted to subscribing terminals. The terminals display the user profile data so that customer service may be enhanced upon the user's arrival. When the user leaves the defined geographic area, the profile data is removed.

20 Claims, 5 Drawing Sheets

(56) References Cited

U.S. PATENT DOCUMENTS

| | | | |
|---|---|---|---|
| 2010/0208619 A1* | 8/2010 | Ho et al. | 370/254 |
| 2010/0318412 A1 | 12/2010 | Karypis et al. | |
| 2011/0207440 A1* | 8/2011 | Ruuspakka et al. | 455/414.1 |
| 2011/0302292 A1* | 12/2011 | Acharya et al. | 709/224 |
| 2012/0084210 A1* | 4/2012 | Farahmand | 705/64 |
| 2012/0158991 A1* | 6/2012 | Ajjaguttu et al. | 709/238 |
| 2012/0237908 A1* | 9/2012 | Fitzgerald et al. | 434/236 |

OTHER PUBLICATIONS

Short Takes: Euclid Elements Has All Eyes on You, http://www.digiday.com dated Nov. 3, 2011.

RFID Journal Award Winner: Best Use of RFID in a Service—RFID Puts Montreal Transit on a New Route, RFID Journal dated Jun. 1, 2008.

* cited by examiner

SYSTEM AND METHOD FOR PROVIDING A VIRTUAL PRESENCE WHILE SECURELY MANAGING AND APPLYING USER PROFILE DATA

FIELD OF THE INVENTION

The present invention relates generally to managing and using customer profile data, and more particularly to providing a virtual presence of a consumer at a commercial establishment before the person's arrival at the establishment to enhance the consumer's experience and to improve the establishment's customer service. For example, a virtual presence based on profile data at a hotel prior to actual arrival would allow a guest to be checked in and provided with amenities immediately upon arrival, and a virtual presence at a restaurant would allow patrons to be seated faster and have their favorite drinks and favorite appetizers waiting. In general, the virtual presence before arrival can greatly improve both a consumer's experience and the hospitality a business can provide.

BACKGROUND OF THE INVENTION

Owners and managers of commercial establishments know that providing excellent customer service is a key factor for success. Correspondingly, customers who receive great customer service return to commercial establishments and spend more money. To improve individualized customer service, businesses have used customer profile information to cater to the personal tastes of their customers. For example, businesses have developed loyalty programs or preferred customer programs to offer benefits to loyal customers, such as discounts, free products and amenities. Often, customers realize the benefits of such programs by swiping a card with a magnetic strip through a magnetic card reader to identify themselves. The identification is then used to access the customer's profile on the business' computer system, before a chosen benefit is applied.

The customer profile is a collection of data that describes the likes, dislikes, tastes and preferences of a customer. Sometimes customers provide this information to businesses. Sometime businesses accumulate data through purchases and other customer activity and build a customer profile. Other times the customer is invited to enroll in a loyalty program or some other promotional program, and, as a part of the enrollment program, the customer provides profile data to the establishment. As a result, many customers have multiple profiles residing on the computer systems of multiple businesses and those businesses have control over the data. This decentralization of data results in inconsistencies and errors across a consumer's multiple profiles and makes updating records a burdensome task. With a customer's several user profiles spread across multiple computers, it is up to the customer to maintain consistency in the profile data. For example, if one changes one's telephone number, multiple establishments must be notified of the new telephone number. This method is cumbersome and error prone. Additionally, as a customer's profile data is placed on more computer systems, more people have access to a customer's personal information.

A problem associated with this system of customer profile use and management is that it can be cumbersome for a consumer. For example, as described, a frequent traveler may have multiple profiles across multiple hotel chains. After a long trip, a traveler will find himself or herself standing in line at the front desk of a hotel, waiting for the clerk. Then, after waiting, the traveler will hand the clerk one of many cards with magnetic strips that the traveler has and wait for the clerk to access the hotel's computers before the clerk might know anything about the customer and be able to offer any benefits and check in a loyal customer. Moreover, because of the possible errors in the hotel's profile, the benefits may not be suitable. Worse yet, a traveler who forget his or her card will have to wait even longer before getting benefits and checking in. The annoyances caused by this scenario not only apply to travelers checking into hotels, they apply to all situations where one may try to realize the benefits of using user profile data.

The widespread use of mobile electronic devices, such as mobile phones, iPads™, tablet PCs and laptop computers provides a solution to the aforementioned problems because they provide the ability for a consumer to communicate with an establishment a suitable time before arriving and to store his or her own profile data on his or her own mobile electronic device. Rather than the frequent traveler arriving at a hotel after a long trip and having to wait in line, hand a clerk a card or verbally provide information, and wait some more before being recognized and treated personally, when the traveler is within a predefined range of the hotel, the traveler may use a mobile electronic device to communicate automatically with a like device at the hotel and to provide arrival and profile information, including a picture. Thus, hotel personnel will be able to check in the customer and arrange benefits before the customer arrives. Once the customer arrives, a hotel clerk can simply hand the traveler a key and state which benefits already have been arranged. The customer will feel important and well attended, and the hotel will provide the best imaginable service. This scenario may be replicated for any type establishment offering products and services to consumers. When the customer leaves the specified geographic area or issues a command to disconnect, the customer's information will be removed from the establishment's electronic devices.

Although the prior art has involved profile matching to customize and direct information to an end user and has also involved using location and profile information to customize material sent to an end user, these systems and methods have involved using profile data to select a subset of material to target to an end user from a larger collection of material. For example, U.S. Pat. No. 5,754,939, issued to Herz, et al., for "System for Generation of User Profiles for a System for Customized Electronic Identification of Desirable Objects" relates to identifying objects such as news articles in an electronic media environment by automatically constructing a "target profile" for each such object based on characteristics such as number of occurrences of particular words and by constructing a "target profile interest summary" for each user that describes a user's interests. The system then compares the target profiles with the target profile interest summaries to create a rank ordered listing of objects most desirable to a particular user. The target profile interest summaries are encrypted to ensure privacy and to give the user control over third party access to user profile information. As another example, U.S. Pat. No. 6,571,279, issued to Herz, et al., for "Location Enhanced Information Delivery System" uses profile information and current location information to transmit customized information to recipients who are local to an information delivery system, such as directing relevant coupons to customers who are near a store or restaurant. As a further example, U.S. Pat. No. 7,441,203, issued to Othmer, et al., for "Interactive User Interface Presentation Attributes for Location-Based Content" provides an electronic ticker service that customizes content transmitted to an end user based on that user's geographic location and attributes entered during a registration process. All of the prior art just referenced involves extracting information from a large data store based on an end user's profile and providing the user with the customized information, and some of this prior art further customizes the information based on the end user's location.

A service offered by Euclid Dynamics uses the unique identifier on a smart phone to gather statistics about customers without accessing personal data. The product can tell whether a certain user has entered the store or its vicinity and how many times, although the identity of the user remains unknown. The product can tell who passes a store and who stops to look in the window. While this system may be useful to store owners, it cannot be used to provide personalized service because the identification mechanism only uses the smart phone's digital identification data.

A product offered at www.guestbridge.com allows a customer to carry a card associated with a particular business that uses RFID technology to alert an establishment that the customer is near the premises. This allows personnel at the business to know that a particular customer is about to arrive. Thus, a customer can be recognized as soon as he or she enters and provided with individualized service. This product, however, is limited. Customers who patronize several different businesses will find themselves having to carry several cards. User profile information will exist in several places under the control of third parties, leading to inconsistent and unsecure profiles for a single person. Updating profiles can be cumbersome. Additionally, this product has a very limited range, leaving the business owner very little flexibility in the time available to prepare for a customer's arrival.

Accordingly, it would be desirable to have a system where a single user profile exists for each customer that is securely controlled by that customer, that is transmitted to a business establishment when the user enters a defined geographic area to provide a virtual presence of the customer, that allows the business establishment enough time to prepare for the customer's arrival, and that removes the user profile from all devices except for the customer's mobile electronic device. This can be accomplished by creating and storing a user profile on a customer's mobile electronic device, such as a smart phone, and broadcasting location information and a unique identifier to a server that monitors whether the user has entered a defined geographic area. Once the user enters the defined geographic area, the mobile electronic device sends the user profile through the server to the screen buffers of electronic devices at the business establishment where the customer is going. Thus, a business may receive information that a customer is going to arrive with appropriate time to prepare. For example, a guest arriving at a hotel may require longer preparation time because of check in time and special amenities that might be delivered to the guest's room. This would not be possible with RFID capable plastic cards. This type of service can be also used for resorts, restaurants, golf courses, retailers and the like so that they may make a great first impression. Additionally, it is further desirable to ensure that the user profile data remains secure and consistent by clearing the profile data from the business owner's devices upon leaving the defined geographic area or upon receiving a defined signal. Thus, systems and methods for providing a virtual presence of a customer before arrival that can be customized for any business are defined. The inventions discussed in connection with the described embodiment address these and other deficiencies of the prior art.

The features and advantages of the present inventions will be explained in or apparent from the following description of the preferred embodiment considered together with the accompanying drawings.

SUMMARY OF THE INVENTION

The present inventions address the deficiencies of the prior art of managing and applying user profiles. Systems and methods are defined that allow the user of a mobile electronic device to maintain and exclusively control one user profile and to provide that user profile to electronic devices at commercial establishments before the user arrives, thus providing a virtual presence at the establishment. When a user enters a defined geographic area, a network is established and the user's mobile electronic device transmits user profile data through a server to the screen buffers of electronic devices at the commercial establishment. The user profile may contain a picture among other personal attributes so that the establishment's personnel can recognize a customer by face and name upon arrival and already know the customer's preferences. When the user leaves the defined geographic area or sends a specific signal, the user profile data is removed from all devices except the user's and the network is dissembled. The data may also be encrypted before it is transmitted and decrypted when placed into the screen buffers. Thus, unlike the prior art, a user can have and maintain a single, secure profile that may be used for programs and services at multiple establishments by providing a virtual presence before arrival using communications networks for cellular-like communications. This is not known to exist in the prior art.

The present inventions define systems and methods for responding to the arrival of a person within a defined geographic area after receiving a virtual presence of the person at a target destination before actual arrival at the target destination. These systems and methods allow the personnel of business establishments to know their customers before their customers arrive by receiving user profiles in advance of arrival.

The systems use a mobile electronic device capable of outputting a unique device identification number such as a Mobile Subscriber Integrated Services Digital Network Number (MSISDN). The mobile electronic device uses a space-based satellite navigation system that outputs position data. The mobile electronic device also has a radio transmitter, a radio receiver, an input device for inputting user profile data, memory for storing user profile data, memory for storing an application that transmits position data, the device identification number and user profile data, and memory for receiving a request profile signal that indicates that the mobile electronic device has entered the defined geographic area. The systems also use a host server that has a radio transmitter, a radio receiver, memory for storing device identification numbers, and memory for storing an application that recognizes device identification numbers and transmits a request profile signal to the mobile electronic device and that receives user profile data from the mobile electronic device and transmits the user profile data to a terminal. The systems further use a terminal that has a display, memory for storing data that appears on the display, and a radio receiver for receiving data from the host server that gets stored in the memory.

In operation, the mobile electronic device periodically transmits its device identification number and position data to the host server. When the host server receives a recognized device identification number and position data indicating that the mobile electronic device is within the defined geographic area, the host server sends a request profile signal to the mobile electronic device. When the mobile electronic device receives a request profile signal, the mobile electronic device transmits user profile data to the host server. When the host server receives user profile data, the host server transmits the user profile data to the terminal. When the terminal receives the user profile data, it places the user profile data into memory so that the user profile data appears on the terminal display.

The user profile data may be encrypted on the mobile electronic device and decrypted on the terminal. The space-based satellite navigation system may be a space-based global navigation satellite system (GNSS), such as Global Positioning System (GPS). The mobile electronic device may be a mobile phone, an iPad™, a tablet PC, or a laptop computer, and the terminal may be a mobile phone, an iPad™, a tablet PC, a laptop computer, or a dumb terminal. In one embodiment, the terminal is attachable to a person's wrist like a watch. Memory in the terminal may also store an application that controls the interface for viewing user profile data.

As a security measure, when the host server receives a device identification number and position data indicating that the mobile electronic device was but no longer is within the defined geographic area, the host server may transmit data to the terminal and clear the user profile data from the terminal. Also, when the host server receives a device identification number and a disconnect signal, the host server may transmit data to the terminal and clear the user profile data from the terminal.

In one configuration, the device identification number and position data are transmitted from the mobile electronic device to a third-party location server, which broadcasts the device identification number and position data and wherein the host server is a subscriber device of the location server broadcasts. In this configuration, an application in the host server detects the position of the mobile electronic device over time and accelerates the rate at which the application retrieves data from the location server if the mobile electronic device is approaching the defined geographic area for improved network performance.

When a user enters the defined geographic area and the target destination receives the virtual presence of a soon to be arriving customer, an adjacent network is created where an adjacent network is defined as a primary device, a service node and a secondary device. The primary device is the mobile electronic device described above. The service node is the host server described above. The secondary device is the terminal described above. The adjacent network assembles when the person arrives within the defined geographic area, and the adjacent network dissembles when the person leaves the defined geographic area.

BRIEF DESCRIPTION OF THE DRAWINGS

The inventions will now be more particularly described by way of example with reference to the accompanying drawings. Novel features believed characteristic of the inventions are set forth in the claims. The inventions themselves, as well as the preferred mode of use, further objectives, and advantages thereof, are best understood by reference to the following detailed description of the embodiments in conjunction with the accompanying drawings, in which:

DETAILED DESCRIPTION OF THE EMBODIMENTS

Figure 1:
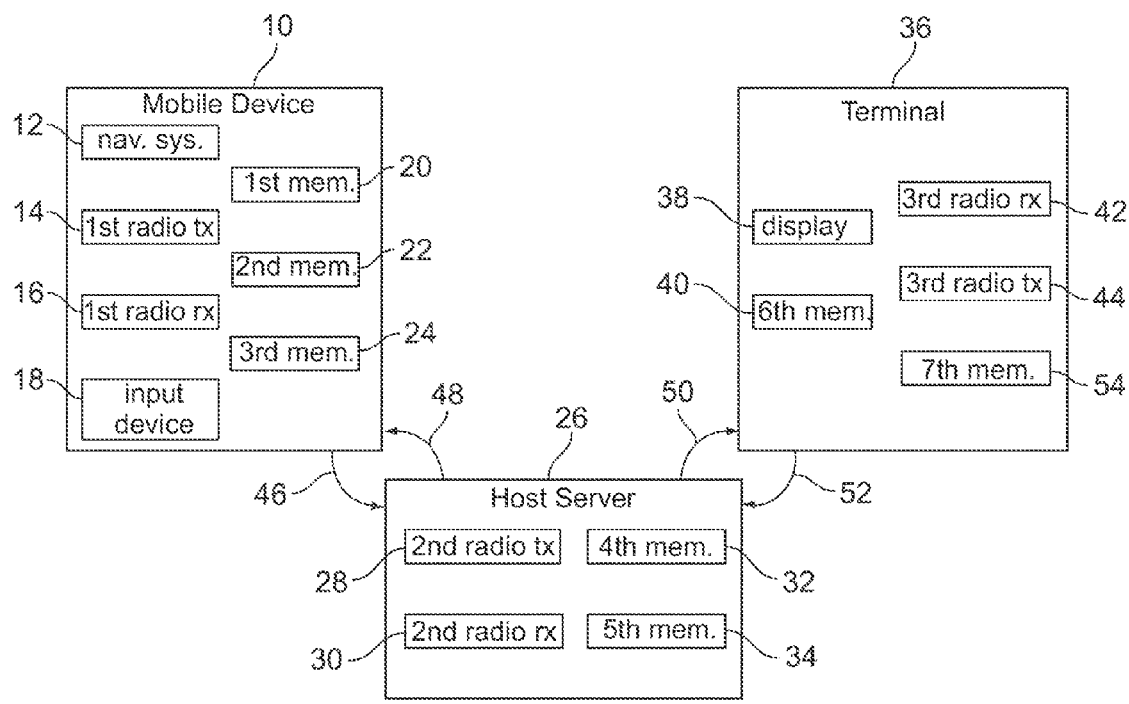
FIG. 1 shows a schematic of the system in a described embodiment.

The described embodiment is a system for responding to the arrival of a person within a defined geographic area by receiving a virtual presence of the person before actual arrival. When the person enters the defined geographic area, service providers are notified and given profile data of the person on a terminal. Thus, the service provider can have services and other amenities available for the person immediately upon arrival based on the profile information. The person entering the defined geographic area has a mobile electronic device, such as a mobile phone, cell phone, iPad, tablet PC, or a laptop computer. The mobile electronic device has GPS capabilities, a transmitter, a receiver, an input device for entering profile information and various memories for storing and processing data and communications signals. The system also has a server that recognizes when a mobile electronic device of a user enters the defined geographic area and a terminal that receives data from the server into a screen buffer for display to the service provider. When a recognized mobile electronic device enters the defined geographic area, the server signals the mobile electronic device to send user profile data to the server, and the server sends the user profile data to the terminal screen buffer for display to the service provider. The user profile data may be encrypted. The service provider may then anticipate the arrival of the mobile electronic device user and use the user profile data to provide customized amenities and services. When the mobile electronic device leaves the defined geographic area or when the server receives certain defined signals, the server clears the screen buffer of the terminal.

The service provider runs a cluster of computers and allows subscribers to register their mobile phones with their service. The only information that the service provider stores about the customers who register is their Mobile Subscriber Integrated Services Digital Network Number (MSISDN), which is a unique number internal to the mobile phone, or some other unique number internal to other types of mobile electronic devices. The service provider does not store any personal profile information about its customers, such as whether they belong to any loyalty programs, any clubs, or any resorts, or any other personal information that may be used in an electronic personal profile. This system allows a customer to get proper attention from a service establishment by communicating the customer's profile to the screen buffers on electronic devices of that service establishment. However, such communication does not permit the service establishment's computers to store the profile information or to make copies of the profile information. The entire customer's profile information and membership information is only kept on the customer's mobile electronic device. When a customer registers with the service provider, an application is downloaded to the customer's mobile electronic device. When a service establishment registers with the service provider, the service establishment provides a list of addresses of computers, or terminals, to the service provider; the users of the terminals are intended to provide service to customers of the service provider.

The application on the customer's mobile electronic device periodically transmits its location to a location server that is either part of the service provider or subscribed to by the customer and the service provider. As the customer approaches the defined geographic area, at a pre-determined distance from the area, a message is sent by the service provider to the application in the customer's mobile electronic device. The service provider has no ability to determine if the customer has any affiliation with the service establishment. The message sent from the service provider to the application on the customer's mobile electronic device prompts the application in the customer's mobile electronic device to instruct the service provider to construct a multicast network. The service provider's server gets a list of terminals and transmits it to the customer's mobile electronic device. The application on the customer's mobile electronic device then tells the service provider's server to create a network where the mobile electronic device is the sole sender of user profile data, the service provider's server acts as a router, and the service establishment's terminals are receivers in the multicast network. The mobile electronic device then exchanges control signals with the terminals, using the server as a transparent router, or proxy. The application on the mobile electronic device then transmits the profile data to the server, which multicasts it to the receivers. An application on the terminals writes the data that the terminals receive to the screen buffers of the respective terminals.

FIG. 1 shows a schematic of the system in a described embodiment. The system is for responding to the arrival of a person within a defined geographic area after receiving a virtual presence of the person at a target destination before actual arrival at the target destination. The system has a mobile electronic device 10 capable of outputting a unique device identification number. In the described embodiment, the mobile electronic device 10 is a mobile phone, an iPad™, a tablet PC, or a laptop computer, or some other similar device. The unique identifier number is a number exclusive to a single device, such as a MSISDN or other like number. The mobile electronic device 10 uses a space-based satellite navigation system 12 that outputs position data. The space-based satellite navigation system 12 may be a space-based global navigation satellite system (GNSS), such as Global Positioning System (GPS) or some other type of space-based satellite navigation system. A first radio transmitter 14 and a first radio receiver 16 are used for transmitting and receiving data from and to the mobile electronic device 10. An input device 18 is used for inputting user profile data and other data. The mobile electronic device 10 also uses a first memory 20 for storing the user profile data, a second memory 22 for storing an application that transmits position data, the device identification number and user profile data, and a third memory 24 for receiving a request profile signal that indicates that the mobile electronic device 10 has entered the defined geographic area.

The system in FIG. 1 also has a host server 26, which has a second radio transmitter 28 and a second radio receiver 30 that is capable of transmitting to and receiving from multiple devices. A fourth memory 32 is used on the host server 26 for storing device identification numbers, and a fifth memory 34 is used on the host server 26 for storing an application that recognizes device identification numbers and transmits a request profile signal to the mobile electronic device 10 and that receives user profile data from the mobile electronic device 10 and transmits the user profile data to a terminal 36.

The system in FIG. 1 further has a terminal 36, which has a display 38, a sixth memory 40 for storing data that appears on the display, and a third radio receiver 42 for receiving data and storing the data in the sixth memory 40. The terminal 36 may also have a third radio transmitter 44 for transmitting data through the host server 26 to the mobile electronic device 10. The terminal 36 may be a mobile phone, an iPad™, a tablet PC, a laptop computer, or a dumb terminal, or some other similar device. In one embodiment, the terminal 36 is approximately the size of an iPod™ nano and can be attached to a wristband and worn like a watch. The terminal 36 may further have a seventh memory 54 for storing an application that controls the interface for viewing user profile data.

In the functioning system, the mobile electronic device 10 periodically transmits its device identification number and position data to the host server 26 with a mobile electronic device transmission 46. When the host server 26 receives a recognized device identification number and position data indicating that the mobile electronic device 10 is within the defined geographic area, the host server 26 sends a request profile signal to the mobile electronic device 10 with a host server response to mobile electronic device 48. When the mobile electronic device 10 receives a request profile signal, the mobile electronic device 10 transmits user profile data to the host server 26 with another mobile electronic device transmission 46. When the host server 26 receives user profile data, the host server transmits the user profile data to the terminal 36 with a host server to terminal transmission 50. When the terminal 36 receives the user profile data, it places the user profile data into the sixth memory 40 so that the user profile data appears on the terminal display 38. In systems where the terminal 36 may send data through the host server 26 to the mobile electronic device 10, using a terminal to host server transmission 52 and a host server response to mobile electronic device 48, the terminal 36 may provide information to the end user. A security feature may be used to encrypt the user profile data on the mobile electronic device 10 and to decrypt the user profile on the terminal 36. When the host server 26 receives a device identification number and position data indicating that the mobile electronic device was but no longer is within the defined geographic area or a disconnect signal, the host server 36 transmits data to the terminal 36 that clears the user profile data from the terminal 36.

The system may also be set up so that the device identification number and position data are transmitted from the mobile electronic device 10 to a third-party location server, which broadcasts the device identification number and position data and wherein the host server 26 is a subscriber device of the location server broadcasts. This way, the system may be able to use existing technology. In this type of embodiment, the application in the fifth memory 34 may be used to detect the position of the mobile electronic device 10 over time and accelerate the rate at which the application retrieves data from the location server if the mobile electronic device 10 is approaching the defined geographic area. This creates a more efficient use of the networks involved with multiple systems running simultaneously.

In a described embodiment, a user approaches the vicinity of a resort establishment and carries his or her mobile electronic device 10. The mobile electronic device 10, or primary device, holds the user profile data, which contains data about previous visits to this resort, the user's likes and dislikes, any notes or annotations made by service personnel during the previous visits, and other historical data relating to the user and to the resort. At all times, the mobile electronic device 10 will be the only repository of the user profile data. No copies or duplicate data items of the user profile data will be created on any other devices or systems. As the user approaches the vicinity of the resort area, a service node, or host server 26, is wirelessly monitoring the geographical area around and within the resort area and is notified of the presence of the approaching user. This notification triggers service logic in the host server 26 that allows one or a plurality of secondary devices, or terminals 36, at the resort area to register to provide services to the approaching user. The primary device, the secondary devices, and the service node, form a network referred to as an adjacent network. The described embodiment may be a part of a system supporting a large number of adjacent networks simultaneously. Each adjacent network contains one primary device, one service node and one or more secondary devices. The host server 26 and the secondary devices may belong to a plurality of adjacent networks simultaneously. The primary device belongs to only one adjacent network at any given time. The adjacent network exists as long as the primary device does not issue an explicit "disconnect" instruction or does not move out of the defined geographic area, which is configurable. The primary device is equipped with GPS and/or other position locating technology and reports its location periodically to a location server in its service provider network that in turn communicates the location to the service node. Once an adjacent network has been established and the secondary devices are registered, all communication between the service node and the secondary devices may be made securely and privately.

Figure 2:
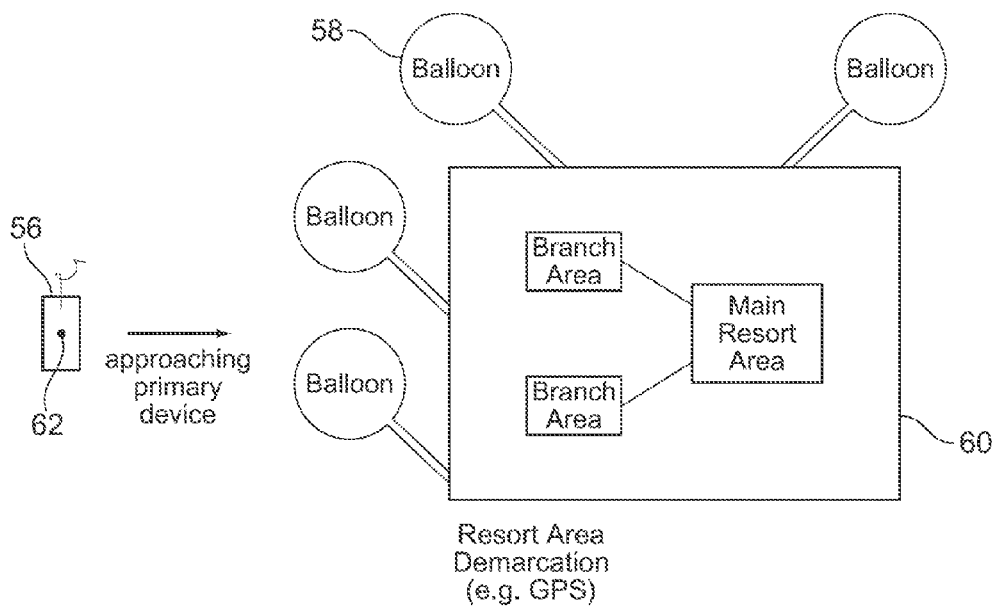
FIG. 2 shows balloon messaging applied to a mobile electronic device entering a defined geographic area.

In the described embodiment, when a user reaches the boundary of the defined geographic area, the primary device receives a message from the service node telling the primary device that it has entered the defined geographic area. This type of messaging is known as "balloon messaging". FIG. 2 shows balloon messaging applied to a mobile electronic device entering a defined geographic area. In FIG. 2, a user 56 is approaching a resort area that is within a defined geographic area 60. The user 56 is carrying a primary device 62, which, as described earlier, is running an application that broadcasts the location of the primary device 62 and its unique identification number. As the user 56 enters into the defined geographic area 60, the user's primary device 62 receives a balloon message 58 as if it is from a balloon floating at the periphery of the defined geographic area 60. When a balloon message 58 is received by a primary device 62, it triggers service logic in the primary device 62 that sends a trigger to the service node. The service node receives the trigger and correlates it with the location updates received from the service provider network. If there is a successful correlation, the service node initiates the process of setting up an adjacent network.

The service node cannot set up the adjacent network unless the trigger is received from the primary device 62. The service node may know the location of the primary device 62 and may know the defined geographic area 60 covered by the resort; however, the service node does not contain any user profile data to tell it whether the consumer is a member of that resort. Only the primary device 62 has that information. The trigger from the primary device 62 to the service node informs the service node that it is allowed to establish the adjacent network, but that decision is dependent on the user profile data and calculations performed by the service logic within the primary device 62.

Figure 3:
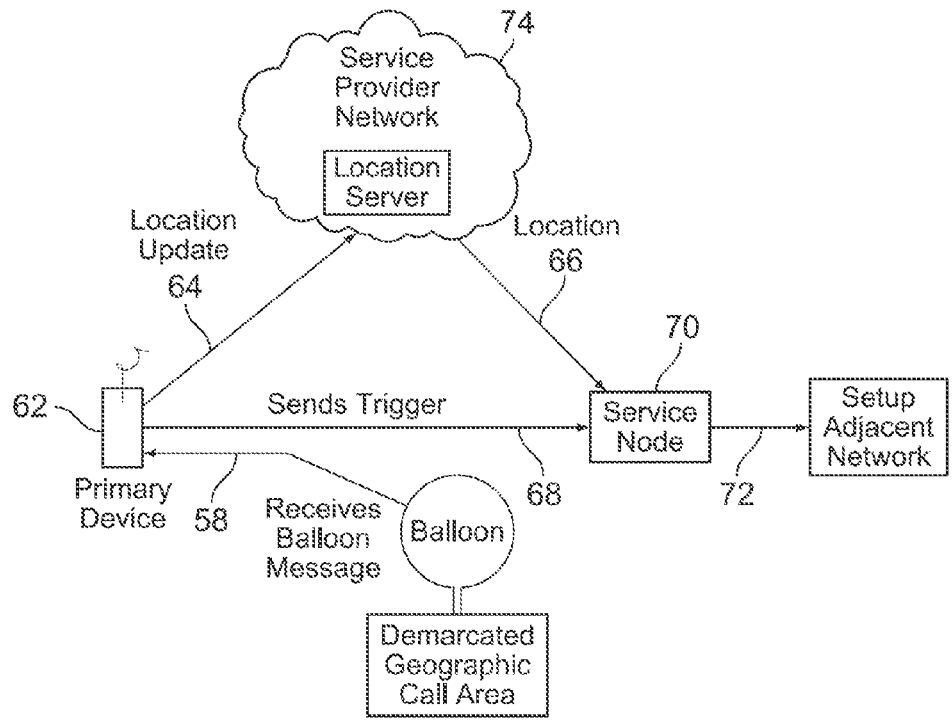
FIG. 3 shows signaling and data flow used to setup an adjacent network.

FIG. 3 shows signaling and data flow used to setup an adjacent network. In the described embodiment, as the primary device 62 travels, it periodically transmits a location update 64 which inform a service provider network 74 to send a location relay 66 to the service node 70. This process continues as long as the aforementioned application is running on the primary device 62. Once the primary device enters a defined geographic area 60, a balloon message 58 is received by the primary device 62. The primary device 62 then sends a primary trigger 68 to the service node 70 telling it to establish an adjacent network. The service node 70 then transmits a secondary trigger 72 to potential secondary devices, giving them the chance to register as part of the adjacent network.

The service node 70 broadcasting a secondary trigger 72 to establish an adjacent network initiates a process of inviting one or more devices to register as secondary devices in the newly formed adjacent network. A secondary device may be a personal computer, a tablet, a laptop, a mobile handset, a smart phone, or any other computing device capable of executing service logic provided through an application interface. The list of secondary devices invited to join the adjacent network is provided to the service node 70 during a prior setup process. The secondary devices receive the invitation to join the adjacent network by receiving a secondary trigger 72, which triggers the application logic to execute in the secondary devices. The secondary devices may then respond to the invitation. A secondary device may join more than one adjacent network simultaneously. The service node 70 is capable of supporting multiple simultaneous adjacent networks. A primary device 62 may support only one adjacent network at any given time.

Figure 4:
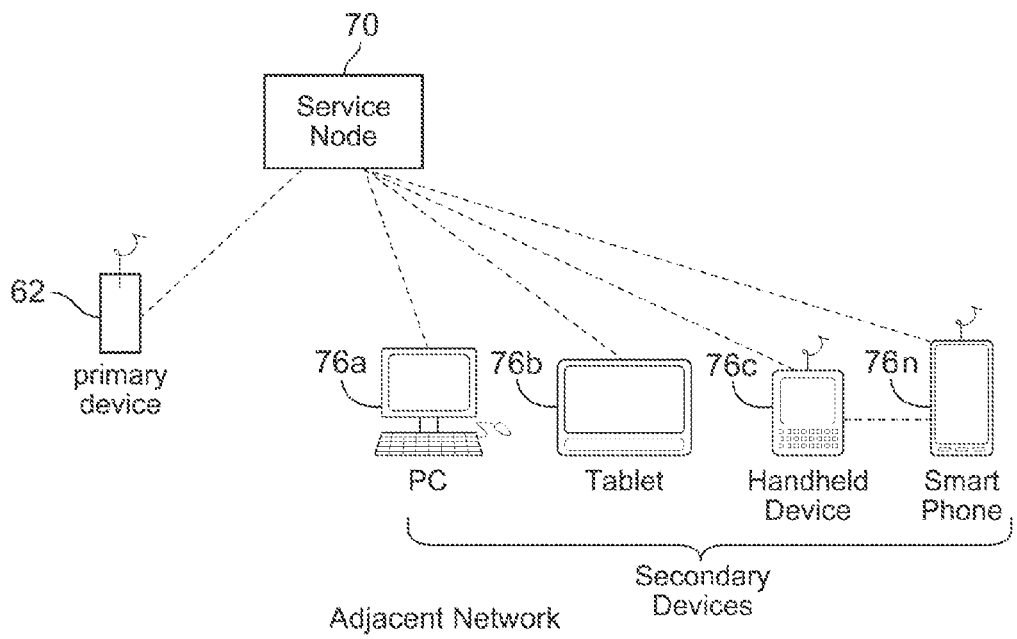
FIG. 4 shows an adjacent network.
Figure 5:
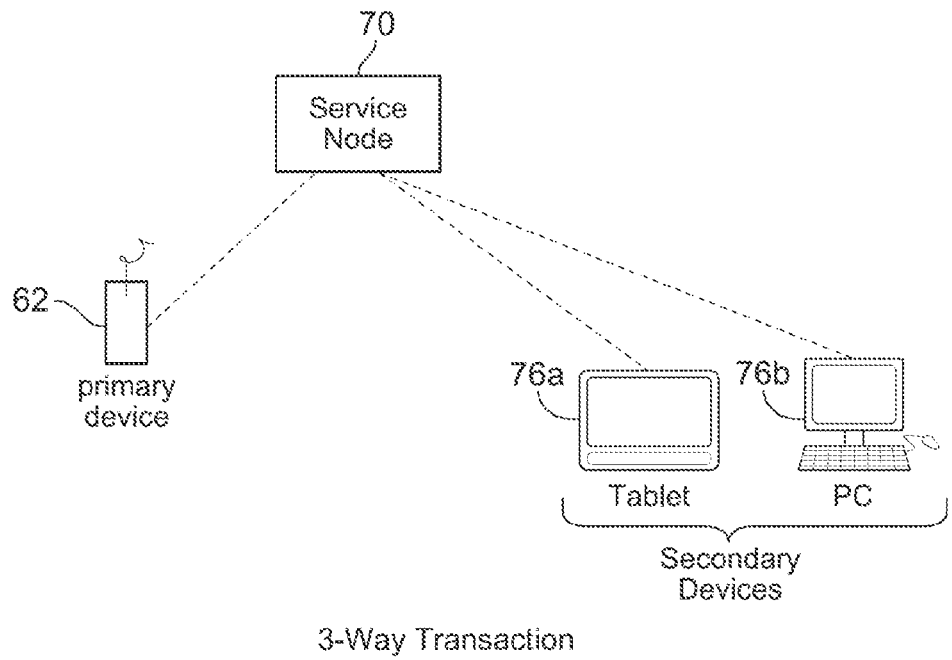
FIG. 5 shows a three-way transaction.

FIG. 4 shows an adjacent network. As in the described embodiment, the primary device 62 communicates with each secondary device 76*a-n* through the service node 70. Likewise, in systems where secondary devices 76*a-n* send data to the primary device 62, that communication is through the service node 70. The configuration shown in FIG. 4 is an n-way transaction, in which n equals an integer representing the number of secondary devices 76*a-n* with which the primary device 62 transacts through the service node 70. FIG. 5 shows a three-way transaction session where the primary device 62 transacts with a secondary device 76*a* that is a tablet PC and with another secondary device 76*b* that is a PC through the service node 70.

In the described embodiments involving n-way transactions, service logic within the service node 70 or within the primary device 62, or within both, may be provided to create a hierarchical structure of profile data so that different parts of a customer's profile may be sent to different personnel in an establishment. This way, one may limit the information seen on a particular secondary device based on the characteristics of the user of the secondary device. For example, at a resort or a hotel, the valet, the concierge, the bellhop and the kitchen staff all need different sets of information about a particular customer to provide the best possible service, and, in some situations, higher level employees need access to more information than lower level employees. The service logic may be used to provide only the needed profile information. Additionally, the data from sender to receiver(s) could be voice, text, video, images, pictures, etc. In some cases the primary device 62 may be used by the consumer to start a voice communication with one or more secondary devices 76*a-n*. In other cases a video call may be used. Thus, as an example, the n-way system may be used by a guest at a resort or hotel to have several hotlines to various service staff members.

As stated above, the service node 70 mediates all information between the primary device 62 and the secondary devices 76*a-n*. Depending upon the nature of the information being transmitted, the service node 70 may manipulate the information, by modifying it in some way such as by reformatting it, by changing its resolution, or by encrypting it. The service node 70 may decide not to transmit the information and may decide to respond using its own service logic. In particular, information received from the primary device 62 may be sent by the service node to one, more than one, or all secondary devices 76*a-n* in the n-way session.

In some embodiments, the service node 70 ensures that all data sent from the primary device 62 that needs to be transmitted to one or more secondary devices 76*a-n*, is sent by using the method of "screen media." In this transmission method, the service node 70 receives the incoming data from the primary device 62, reformats it as a screen image and transmits it to the screen buffer(s) of the receiving secondary device(s) 76a-n. All present computing devices use a certain part of or kind of memory called a screen buffer. Logic that needs to display any information, e.g., picture, image, etc., on the display of a computing device creates an internal representation of the information and stores it in the screen buffer. Logic called a renderer then takes this internal representation and displays it on the display screen of the device. The display is refreshed at a periodic rate by the renderer. The salient feature of this process is that it is not possible for the computing device to make a copy or store the contents of the screen buffer.

In the described embodiment, when a service node receives responses back from a plurality of secondary devices in response to its first invitation request, it establishes an n-way session between the primary device and the "n" responding secondary devices. The service node then requests and receives permission to proceed from the primary device. A positive response to the request to proceed causes the service node to create a unique user ID (UID) that is then displayed as a presence indicator on all secondary devices and the primary device. The UID sent to the secondary devices may consist of a picture or an image of the consumer for identification purposes.

In an implementation of the described embodiment, as the consumer approaches the resort's defined geographic area, his primary device receives a wireless balloon message, causing the primary device to trigger the service node to trigger the setup of an adjacent network where the primary device and a plurality of secondary devices are bound in a n-way session. As the consumer approaches a welcoming station, one or more resort employees may greet the consumer. The greeting may include the personnel verifying the identity of the consumer via the screen image displayed on their secondary devices. Once the consumer is positively identified the resort personnel "click" or "touch" the presence indicator to verify that they are servicing the consumer. This verification gesture sends a command back to the service node, which in turn requests and receives any notes and annotations pertaining to this resort from the primary device and sends it to be displayed on the secondary devices. For example, once the identity of the consumer has been established, the secondary devices displays may show that the consumer is owed a special car wash from his last visit, that he likes his car to be kept in a covered parking area, and when his car is cleaned, no fragrance is to be used in the interior of the car. The consumer may also be given information, such as how many points he or she has in the resort's loyalty program, how many will be earned during the current visit, and all the amenities that will be received, e.g. a free newspaper, breakfast, or free use of the health club. The consumer may also be notified of special promotions, such as a percentage off of the consumer's favorite dinner.

Elements of the above described procedure may be repeated in every interaction that the consumer has at the resort, either face to face or when calling someone at the resort for a service request. The resort personnel touch or click the presence indicator of the consumer to verify identity. Once confirmed, the secondary displays receive pertinent information about the consumer from the primary device, which is displayed on the secondary devices using the screen media method. If a secondary device needs any information from the user profile it may send a request to the service node, which transmits the request to the primary device, where the user profile data is stored. The primary device may respond to the request and send the requested data to the service node, which transmits the data, possibly modified, to the secondary devices.

When the consumer departs from the resort area, he or she receives a wireless balloon message at the periphery of the resort. This causes the primary device to send a trigger to the service node. The service node knows that an adjacent network is in existence for the primary device, ensures that the location of the device is indeed indicating a departure from the resort area and, if confirmed, terminates the adjacent network and clears the user profile data from the secondary devices. Because all data sent to the secondary devices was via the screen media method, no copies or duplications of the user profile exist in the secondary devices. The one and only original user profile remains on the primary device.

Figure 6:
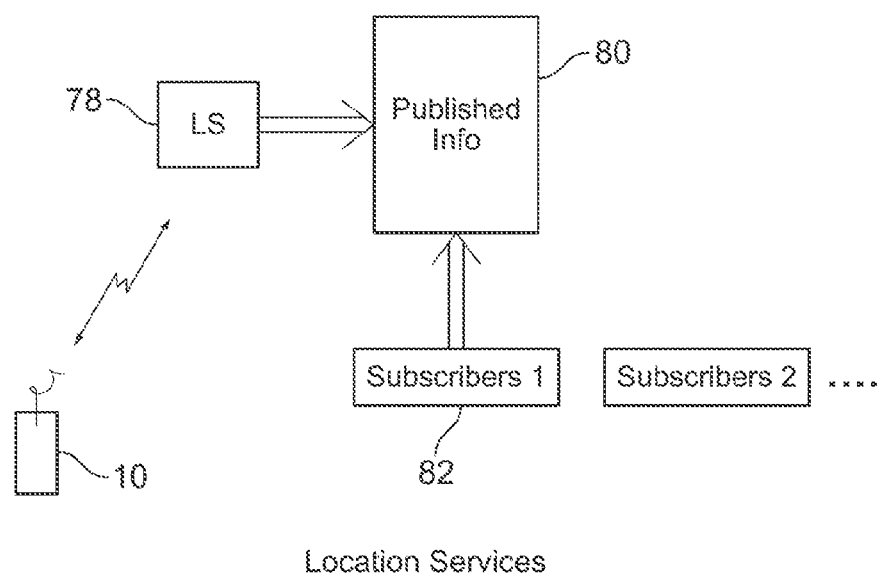
FIG. 6 shows the function of a location server.

As stated earlier, in a described embodiment, the proximity sensing of the primary device by the service node may utilize a location server. Typically, location servers publish a consumer's location information and other server's consume the published information. FIG. 6 shows the function of a location server. A location server 78 receives broadcast location updates from a mobile electronic device 10 and produces published location information 80. One or more mobile electronic devices are subscribers 82 to the published information.

Figure 7:
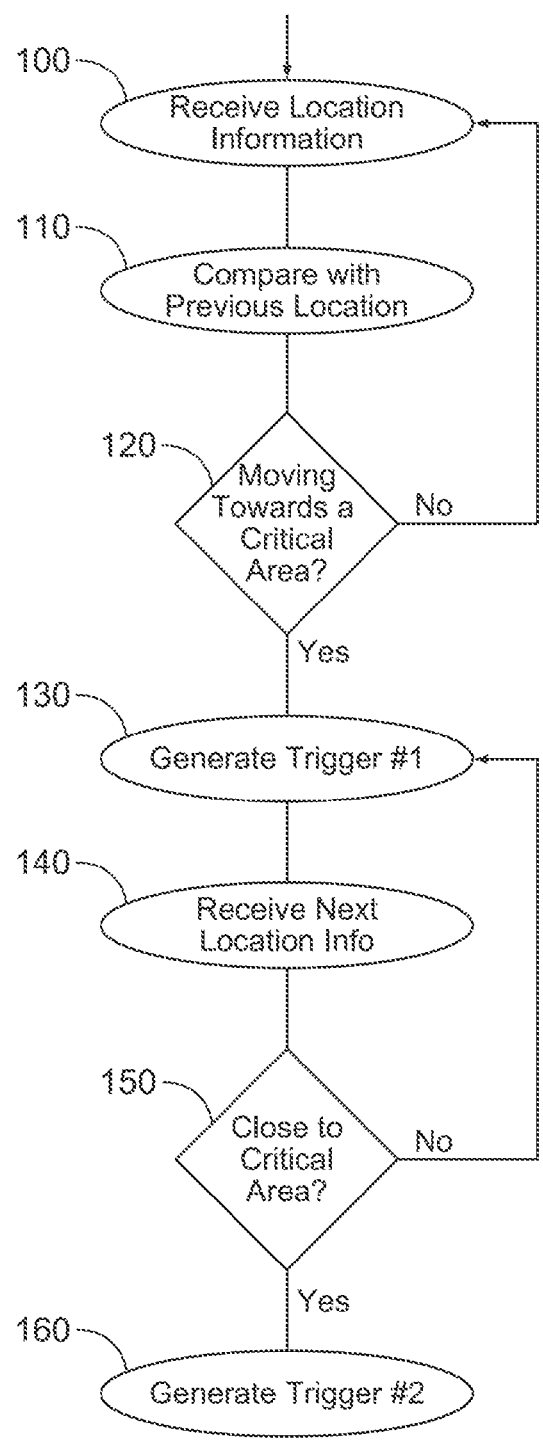
FIG. 7 shows the function of a geographical information server.

One subscriber 82 device is the service node discussed above. The service node contains service logic that performs several functions. One function is described by the flowchart of FIG. 7, which shows the function of a geographical information server within the service node. In step 100, the service logic receives location information about a particular subscriber from information published by the location server. In step 110, the service logic compares this location information with previously stored locations of the subscriber. In step 120, the service logic determines if the consumer is moving towards a defined geographic area previously demarcated to the service node. If a positive determination is made in step 120, a trigger is generated in step 130 that accelerates the rate at which published information for this particular subscriber is retrieved by the service node, and in step 140 the service node receives the next location update. This feature allows the service node to optimize the rate of information retrieval and hence the networking costs by checking more frequently when a particular consumer is near a defined geographic area. In step 150, the service logic checks if the particular subscriber has entered a critical geographic area and, if so, it generates a trigger in step 160.

Another function of the service node is to provide service logic for a suitably modified presence server. Presence servers are commonly used in telecommunications applications to provide presence information about consumers. Typically, when a consumer signs on to a certain device service, the service reports such activity to a presence server that in turn notifies other clients of the presence of the consumer on the network. These notifications are typically referred to as presence updates. In certain systems, colors are used to indicate the update status of a service user, e.g., a green circle may indicate that the consumer is online. In other systems, certain phrases may be associated with the status of a consumer, e.g., a red color circle and the phrase "will be back shortly" may indicate that the consumer is not online but may change his or her status shortly. Status update messages are sent from a service provider to a presence server using certain signaling protocols, such as the eXtensible Messaging and Presence Protocol (XMPP). In the described embodiment, the service node acts as a presence server. That is, it has logic to respond to signaling protocol languages such as XMPP among others.

In the described embodiment, the geographic location of a user is used to generate a status update to the presence server on the service node. Specifically, step 160 of FIG. 7 generates a status message update using a suitable signaling protocol, such as XMPP, to update the status of a subscriber on the service node. In the described embodiment, the applications running on the user's mobile electronic device, the presence server and the terminal all support XMPP or some other similar protocol.

It should be noted that a physical computer may contain multiple different service logics, each service logic providing a unique set of services. Each service logic constitutes a logical server, and it is in this sense that the service node acts both as a presence server and as a geographical information server.

Upon receiving a status update message from the geographical information server, the service node's presence server publishes an update of the status of the particular subscriber. Various clients of the presence server may subscribe to such published information. The presence server maintains a list of clients and is divided into specific groups. The presence server is able to publish status updates only to clients within a specific group. Clients not belonging to the specific group are not made aware of the status update. The group of clients permitted to receive a status message is known as the preferred group of clients.

As stated, a presence server receives status updates from a client device and publishes the update for the use of other subscribers. These status update messages indicate the state of the particular subscriber. In the described embodiment, the status update messages sent to a presence server are modified to contain a special object called a micro server. The service node presence server is suitably programmed to receive such extended messages containing micro server objects. In particular, when the presence server receives such status messages, it passes the micro server object and the list of clients in the preferred group associated with the message to a pop-up server that prepares data for display.

Figure 8:
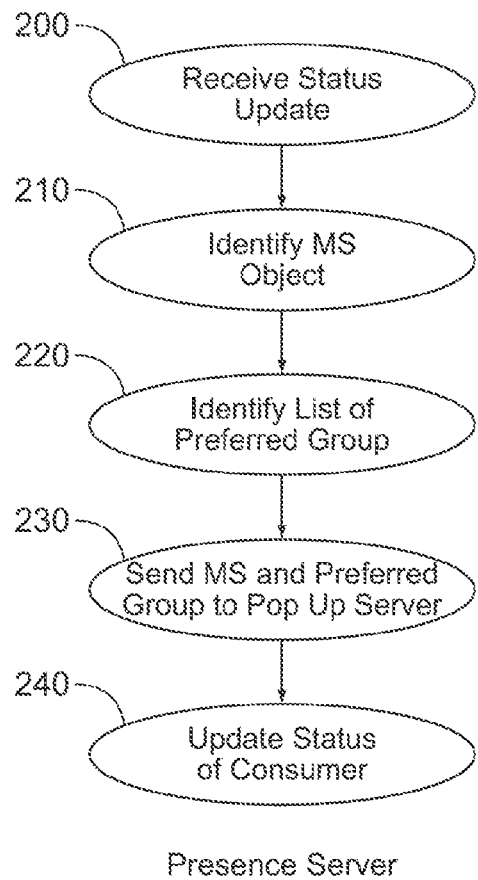
FIG. 8 shows the use of extended messaging through a presence server.

FIG. 8 shows the use of extended messaging through a presence server. In step 200, the presence server receives a status update message. In step 210, the presence server identifies the sub-component micro server contained within the message. In step 220, the presence server identifies the preferred group associated with the sender of this status message. In step 230, the presence server passes the micro server and preferred group information to a pop-up server. In step 240, the presence server updates the status of the user. The updated status is available only to members of the preferred group. Moreover, the status update is displayed by the clients of the preferred group in a mouse-sensitive or gesture-sensitive manner. In other words, the status update information resulting from a modified status message is prepared to respond to a mouse or other user input devices.

Figure 9:
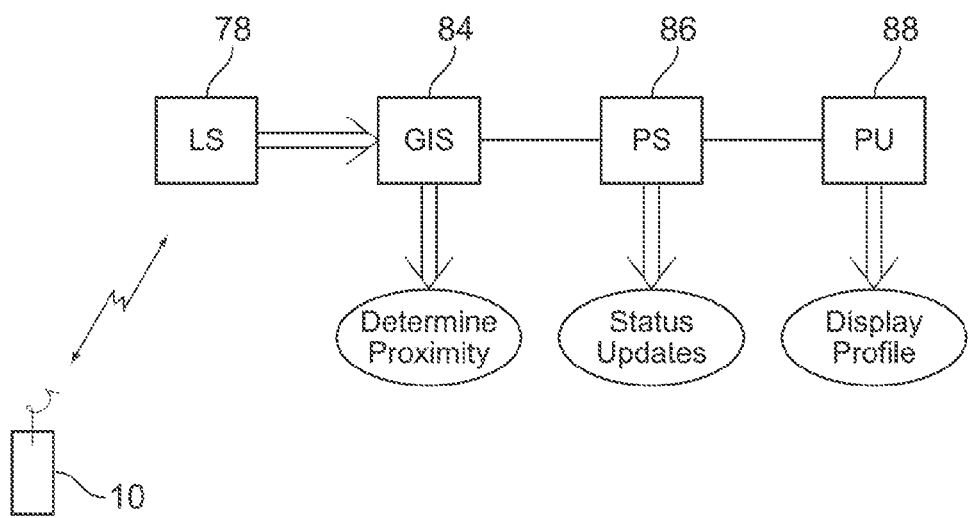
FIG. 9 shows the interactions between and the functions of the various servers in the service node.

FIG. 9 shows the interactions between and the functions of the various servers in the service node. For example, a consumer approaches a specifically defined geographic area. As the consumer nears the designated area, the consumer's mobile electronic device 10 issues location updates to the location server 78, which publishes the information. The geographical information server 84 consumes this information, determines proximity, and may respond by determining that the consumer has entered, or is about to enter, the defined geographic area. The geographical information server 84 generates a trigger message that issues a status update to the presence server 86. The presence server 86 then issues a status update to certain preferred clients about the consumer's presence. This status update is a mouse or gesture-sensitive object that is displayed by the client of the presence server 86 in the form of a pop-up server that shows user profile data. In the case of a resort, the preferred clients are the service personnel, and when the consumer enters the defined geographic area, the consumer's user profile data appears on the display screens of the service personnel's devices.

The micro server object received by the pop-up server has two components. The first component contains service logic and the second component contains certain data elements. The service logic is an interpreter and the data elements are the user profile. The interpreter responds to specific requests received from the clients in the preferred group, which are messages received from user input such as mouse coordinates and/or gesture recognition. In response to the mouse or gesture commands, the interpreter determines if the received command should cause the user profile data to be displayed. If a positive determination is made, the interpreter causes the user profile data to be displayed as a pop-up on the client display. In response to another user command, the interpreter may clear the user profile data from the display.

The Interpreter logic within the micro server may be programmed to display the user profile data once or a certain number of times. It may also be programmed to display the user profile data only for a certain time period. It may further be programmed to delete the user profile data if a new status update is received, e.g., the consumer is no longer present within the defined geographic area.

Described embodiments may be implemented in or in conjunction with a mobile telephone, such as a wireless or cellular "smart" telephone. In some embodiments, the cellular telephone may implement one or more elements of the methods disclosed herein. The cellular telephone includes control logic and a cellular transceiver. The cellular transceiver allows communication over a cellular telephone network, such as a LTE, GSM or GPRS based cellular telephone networks. The control logic generally controls operation of the cellular telephone and, in some embodiments, implements consumer presence capability as described in the embodiments of the present invention.

In one embodiment, the service node consists of three components: 1) a presence server based on XMPP protocol; 2) a mobile application client program based on the XMPP client protocol supporting registration, alerts, and messaging; and 3) a terminal application based on XMPP client protocol supporting registration, alerts, and messaging. The presence server provides basic routing, messaging and presence functions. The client program provides periodic location updates and allows a user to input identification data, profile data and a photo, which it stores locally on client device memory. Then, the client provides a user ID, a photo and profile information upon demand from the service node, possibly using an out of band protocol.

When initializing the service node, the defined geographic area is created and a virtual circle number is assigned using an application on a personal computer or a mobile electronic device. The initialization program allows a geographic region to be specified using Google Maps. The region is a circle with a radius R and can be within a range of 2 feet to 100 feet, although other embodiments may use other distances. Such a region is called a virtual circle and is identified by a virtual circle number, VCN. Graphical user input is needed, such as drawing and pointer tools, to create the defined geographic area. Multiple terminals may be associated with a VCN, and each terminal is identified by a terminal ID (TID). The initialization application then sends the VCN definition to the presence server for registration of a location component, and the presence server updates its internal database and outputs that a VCN has been registered and defined. When adding a location component to the presence server, GPS coordinates are entered from a mobile telephone using the location update protocol. If the mobile telephone is within a defined radius identified by the VCN, location information is extracted from the mobile telephone and a location update is published information as for the VCN. If the mobile telephone is within the defined geographic area, the user profile information is extracted from the mobile telephone and published to the terminal applications.

The terminal application subscribes to presence update messages from the presence server. Upon a newly published presence update for its VCN, the terminal application parses the update message and updates the status of the user. The terminal application creates a mouse sensitive area for displaying user profile data and allows mouse sensitive commands, such as display, scroll up, scroll down, expand, and zoom functions on user profile data. A message is displayed to indicate that a customer is arriving. When the user departs the defined geographic area, a presence update deletes the user profile data. In the described embodiment, all communication between client and server programs is through an XML publish and subscribe paradigm, except the presence server location component and the mobile application may communicate through an out of band protocol, which may be implemented as an HTTP request-response protocol.

While the present inventions have been illustrated by a description of various embodiments and while these embodiments have been set forth in considerable detail, it is intended that the scope of the inventions be defined by the appended claims. It will be appreciated by those skilled in the art that modifications to the foregoing preferred embodiments may be made in various aspects. It is deemed that the spirit and scope of the inventions encompass such variations to be preferred embodiments as would be apparent to one of ordinary skill in the art and familiar with the teachings of the present application.

What is claimed is:

1. A system for responding to the arrival of a person within a defined geographic area after receiving a virtual presence of the person at a target destination before actual arrival at the target destination comprising:
    a mobile electronic device configured to output a unique device identification number comprising:
        a space-based satellite navigation system that outputs position data;
        a first radio transmitter;
        a first radio receiver;
        an input device for inputting user profile data that contains personal attributes and preferences for service personnel to recognize;
        a first memory for storing user profile data;
        a second memory for storing an application that transmits position data, the device identification number and user profile data; and
        a third memory for receiving a request profile signal that indicates that the mobile electronic device has entered the defined geographic area;
    a host server comprising:
        a second radio transmitter;
        a second radio receiver;
        a fourth memory for storing device identification numbers; and
        a fifth memory for storing an application that recognizes device identification numbers and transmits a request profile signal to the mobile electronic device and that receives user profile data from the mobile electronic device, reformats the user profile data into a screen image and transmits the screen image without storing the user profile data in memory on the host server and that transmits data to clear the screen image; and
    a terminal comprising:
        a display;
        a sixth memory comprising a screen buffer for storing the screen image that appears on the display; and
        a third radio receiver for receiving the screen image and storing the screen image in the sixth memory screen buffer without storing the screen image in any other memory on the terminal so that the user profile data is maintained privately and securely only on the mobile electronic device;
    wherein the mobile electronic device periodically transmits its device identification number and position data to the host server;
    wherein when the host server receives a recognized device identification number and position data indicating that the mobile electronic device is within the defined geographic area, the host server sends a request profile signal to the mobile electronic device;
    wherein when the mobile electronic device receives a request profile signal, the mobile electronic device transmits user profile data to the host server;
    wherein when the host server receives user profile data, the host server transmits the user profile data to the terminal; and
    wherein when the terminal receives the user profile data, it places the user profile data into the sixth memory so that the user profile data appears on the terminal display.

2. The system recited in claim 1 wherein user profile data is encrypted on the mobile electronic device and decrypted on the terminal.

3. The system recited in claim 1 wherein the space-based satellite navigation system is a space-based global navigation satellite system (GNSS), such as Global Positioning System (GPS).

4. The system recited in claim 1 wherein the mobile electronic device is one of a mobile phone, iPad™, tablet PC, and a laptop computer and wherein the terminal is one of a mobile phone, iPad™, tablet PC, a laptop computer, and a dumb terminal.

5. The system recited in claim 1 wherein when the host server receives a device identification number and one of position data indicating that the mobile electronic device was but no longer is within the defined geographic area and a disconnect signal, the host server transmits data to the terminal that clears the user profile data from the terminal.

6. The system recited in claim 1 further comprising a third radio transmitter in the terminal for transmitting data through the host server to the mobile electronic device.

7. The system recited in claim 1 wherein the terminal is attachable to a person's wrist.

8. The system recited in claim 1 further comprising a seventh memory in the terminal for storing an application that controls the interface for viewing user profile data.

9. The system recited in claim 1 wherein the device identification number and position data are transmitted from the mobile electronic device to a third-party location server, which broadcasts the device identification number and position data and wherein the host server is a subscriber device of the location server broadcasts.

10. The system recited in claim 9 wherein the application in the fifth memory detects the position of the mobile electronic device over time and accelerates the rate at which the application retrieves data from the location server if the mobile electronic device is approaching the defined geographic area.

11. A system for responding to the arrival of a person within a defined geographic area after receiving a virtual presence of the person at a target destination before actual arrival at the target destination comprising:
an adjacent network wherein the adjacent network is defined as a primary device, a service node and a secondary device;
wherein the primary device comprises:
a mobile electronic device configured to output a unique device identification number comprising:
a space-based satellite navigation system that outputs position data;
a first radio transmitter;
a first radio receiver;
an input device for inputting user profile data that contains personal attributes and preferences for service personnel to recognize;
a first memory for storing user profile data;
a second memory for storing an application that transmits position data, the device identification number and user profile data; and
a third memory for receiving a request profile signal that indicates that the mobile electronic device has entered the defined geographic area;
wherein the service node comprises:
a host server comprising:
a second radio transmitter;
a second radio receiver;
a fourth memory for storing device identification numbers; and
a fifth memory for storing an application that recognizes device identification numbers and transmits a request profile signal to the mobile electronic device and that receives user profile data from the mobile electronic device, reformats the user profile data into a screen image and transmits the screen image without storing the user profile data in memory on the host server and that transmits data to clear the screen image; and
wherein the secondary device comprises:
a terminal comprising:
a display;
a sixth memory comprising a screen buffer for storing the screen image that appears on the display; and
a third radio receiver for receiving the screen image and storing the screen image in the sixth memory without storing the screen image in any other memory on the terminal so that the user profile data is maintained privately and securely only on the mobile electronic device;
wherein the primary device periodically transmits its device identification number and position data to the service node;
wherein when the service node receives a recognized device identification number and position data indicating that the primary device is within the defined geographic area, the service node sends a request profile signal to the primary device;
wherein when the primary device receives a request profile signal, the primary device transmits user profile data to the service node;
wherein when the service node receives user profile data, the service node transmits the user profile data to the secondary device;
wherein when the secondary device receives the user profile data, it places the user profile data into the sixth memory so that the user profile data appears on the secondary device display; and
wherein the adjacent network assembles when the person arrives within the defined geographic area, and the adjacent network dissembles when the person leaves the defined geographic area.

12. The system recited in claim 11 wherein user profile data is encrypted on the primary device and decrypted on the secondary device.

13. The system recited in claim 11 wherein when the service node receives a device identification number and one of position data indicating that the primary device was but no longer is within the defined geographic area and a disconnect signal, the service node transmits data to the secondary device that clears the user profile data from the secondary device and the adjacent network dissembles.

14. The system recited in claim 11 further comprising a third radio transmitter in the secondary device for transmitting data through the service node to the primary device.

15. The system recited in claim 11 further comprising a seventh memory in the secondary device for storing an application that controls the interface for viewing user profile data.

16. The system recited in claim 11 wherein the device identification number and position data are transmitted from the primary device to a third-party location server, which broadcasts the device identification number and position data and wherein the service node is a subscriber device of the location server broadcasts.

17. The system recited in claim 16 wherein the application in the fifth memory detects the position of the primary device over time and accelerates the rate at which the application retrieves data from the location server if the primary device is approaching the defined geographic area.

18. A method for responding to the arrival of a person within a defined geographic area after receiving a virtual presence of the person at a target destination before actual arrival at the target destination comprising:
providing a mobile electronic device configured to output a unique device identification number comprising:
a space-based satellite navigation system that outputs position data;
said mobile electronic device configured to store user profile data;
an application that transmits position data, the device identification number and user profile data with the mobile electronic device configured to receive a request profile signal that indicates that the mobile electronic device has entered the defined geographic area;
providing a host server comprising:
an application that recognizes device identification numbers and transmits a request profile signal to the mobile electronic device and that receives user profile data from the mobile electronic device, with the host server configured to reformat the user profile data into a screen image and configured to transmit the screen image without storing the user profile data in memory on the host server and further configured to thereafter transmit data that clears the screen image; and
providing a terminal comprising:
a display; and
a screen buffer for receiving and storing the screen image that appears on the display
without storing the user profile data in any other memory on the terminal so that the user profile data is maintained privately and securely only on the mobile electronic device responsive to the data transmitted from the host server that clears the screen image.

19. The method recited in claim 18 further comprising:
transmitting a device identification number and position data from the mobile electronic device to the host server periodically;
receiving a recognized device identification number and position data on the host server from the mobile electronic device indicating that the mobile electronic device is within the defined geographic area;
sending a request profile signal from the host server to the mobile electronic device;
receiving a request profile signal on the mobile electronic device from the host server;
transmitting user profile data to the host server from the mobile electronic device;
receiving user profile data on the host server from the mobile electronic device;
reformatting the user profile data into a screen image;
transmitting the screen image from the host server to the terminal;
receiving the screen image on the terminal;
placing the screen image into the screen buffer so that the user profile data appears on the terminal display;
encrypting the user profile data on the mobile electronic device before sending it to the host server;
decrypting the user profile data on the terminal when it is received from the host server;
sending data from the host server that clears user profile data from the terminal when the host server receives a device identification number and position data from the mobile electronic device indicating that the mobile electronic device was but no longer is within the defined geographic area;
sending data from the host server that clears user profile data from the terminal when the host server receives a device identification number and a disconnect signal from the mobile electronic device; and providing in the terminal an application that controls the interface for viewing user profile data.

20. The method recited in claim 18 further comprising:
transmitting a device identification number and position data from the mobile electronic device to the host server periodically;
receiving a recognized device identification number and position data on the host server from the mobile electronic device indicating that the mobile electronic device is within the defined geographic area;
sending a request profile signal from the host server to the mobile electronic device;
receiving a request profile signal on the mobile electronic device from the host server;
transmitting user profile data to the host server from the mobile electronic device;
receiving user profile data on the host server from the mobile electronic device;
reformatting the user profile data into a screen image;
transmitting the screen image from the host server to the terminal;
receiving the screen image on the terminal;
placing the screen image into the screen buffer so that the user profile data appears on the terminal display;
transmitting the device identification number and position data from the mobile electronic device to a third-party location server;
broadcasting the device identification number and position data from the third-party location server;
receiving the broadcast device identification number and position data on the host server;
detecting the position of the mobile electronic device over time; and
accelerating the rate at which the application retrieves data from the location server if the mobile electronic device is approaching the defined geographic area.

* * * * *